June 21, 1938.　　W. H. DE LANCEY　　2,121,120
FLUID METER
Filed June 11, 1937　　3 Sheets-Sheet 1
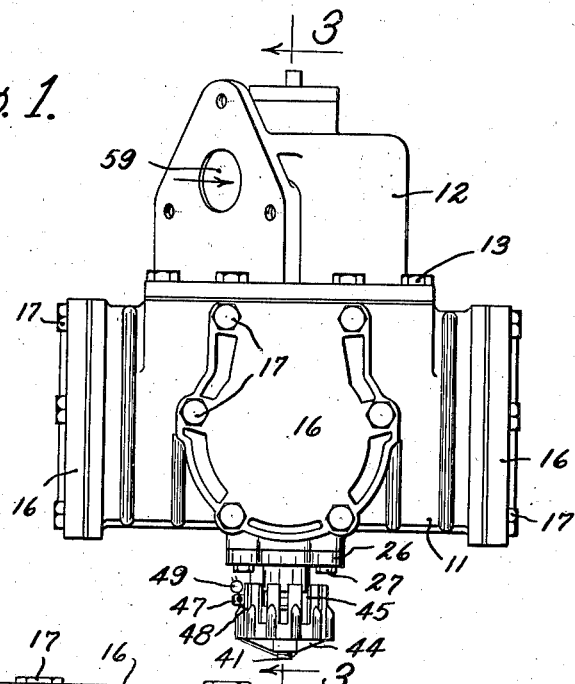
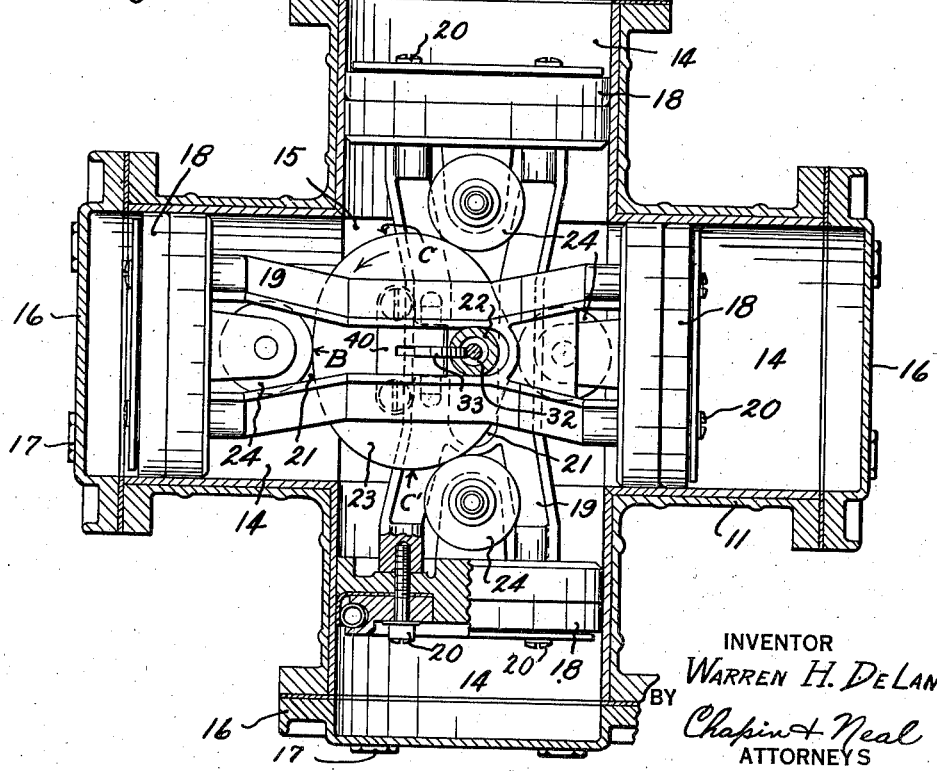
INVENTOR
WARREN H. DE LANCEY
BY Chapin + Neal
ATTORNEYS June 21, 1938.  W. H. DE LANCEY  2,121,120
FLUID METER
Filed June 11, 1937   3 Sheets-Sheet 2
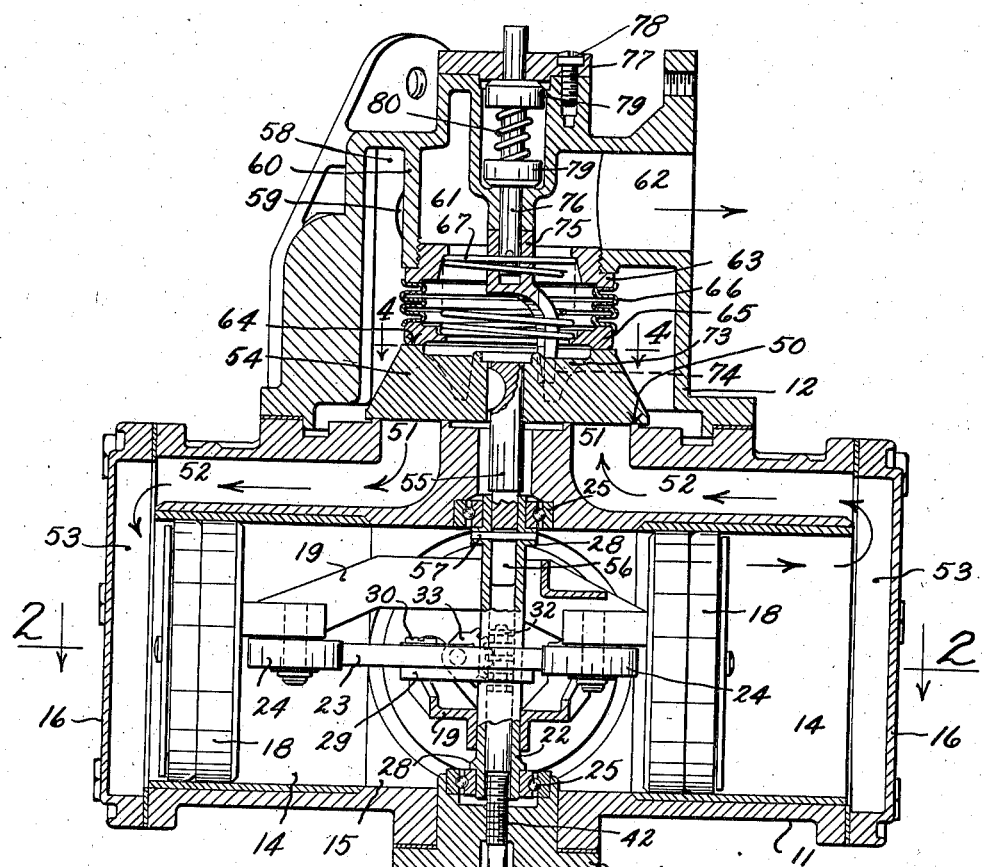
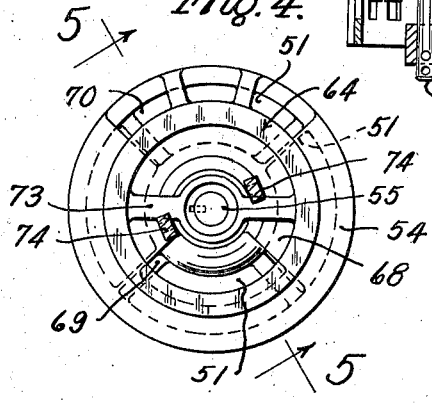
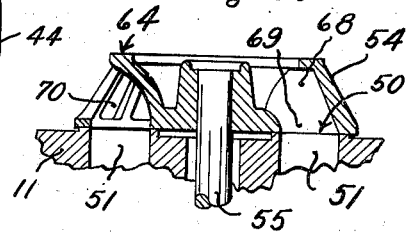
INVENTOR
WARREN H. DE LANCEY
BY Chapin + Neal
ATTORNEYS

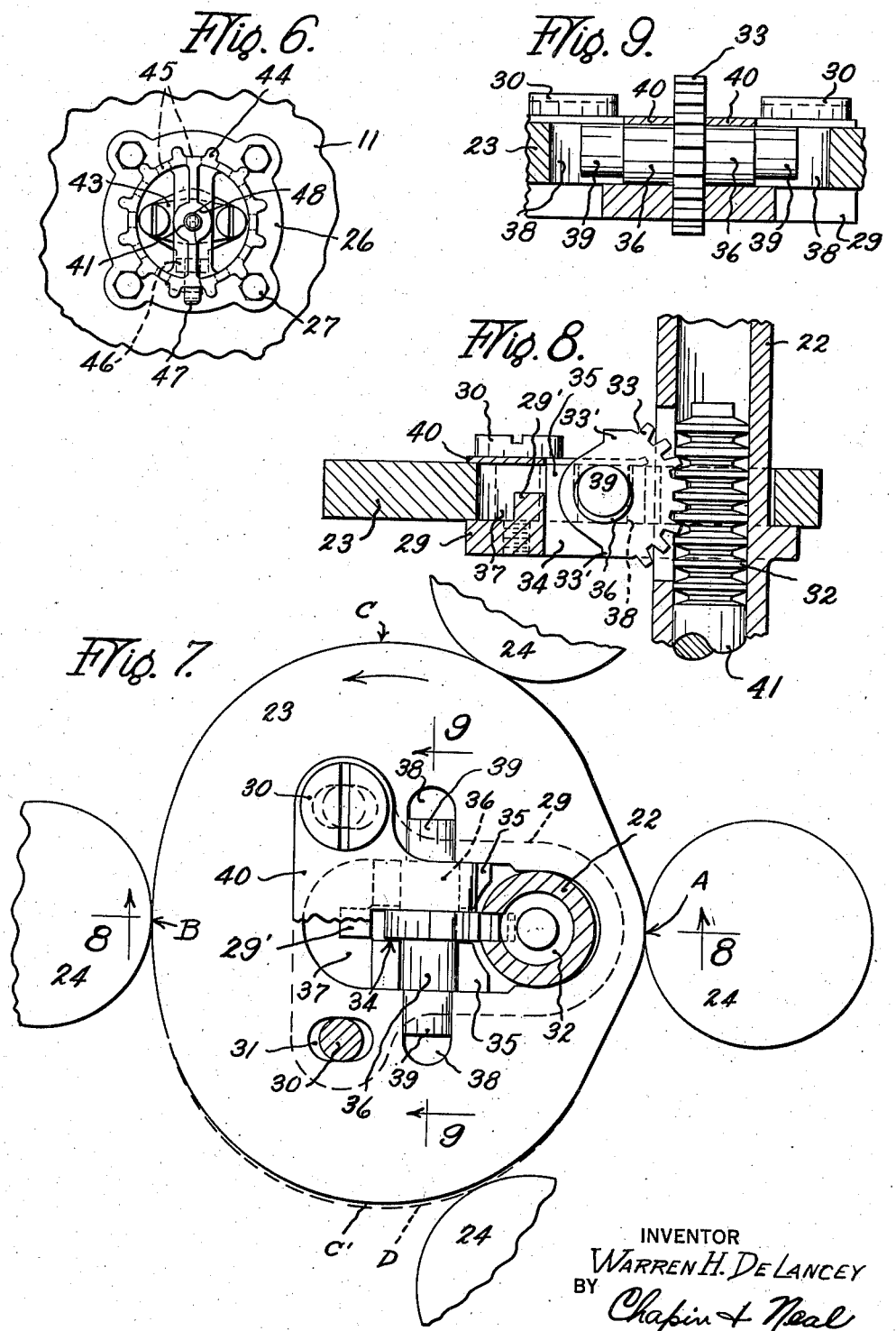

Patented June 21, 1938

2,121,120

UNITED STATES PATENT OFFICE

2,121,120

FLUID METER

Warren H. De Lancey, Springfield, Mass., assignor to Gilbert & Barker Manufacturing Company, West Springfield, Mass., a corporation of Massachusetts Application June 11, 1937, Serial No. 147,730

1 Claim. (Cl. 73—247)

This invention relates to improvements in fluid meters of the positive displacement type, such for example as are used in connection with the dispensing of measured quantities of gasoline, where a high degree of accuracy is desired.

A common form of displacement meter includes a plurality of pistons, movable in their cylinders by the pressure of the liquid forced into the cylinders under the control of a rotary valve, and a shaft which is rotated by the reciprocating movement of the pistons and drives the valve and a suitable register for indicating the quantities of liquid flowing through the meter. A common form of connection between the pistons and shaft is a crank and link connection and it is old to make the crank pin adjustable in throw for the purpose of calibrating the meter.

Where the meters are used for dispensing fractional as well as unit quantities, the pistons may stop at various points, as distinguished from predetermined points only, in their cycles of movement and it is necessary that the quantity indicated by the register correspond exactly with the quantity displaced from the meter by the pistons, regardless of the point in the cycles at which the pistons stop. The requirement is that uniform increments of volume of liquid discharged from the meter shall produce uniform increments of rotation of the meter shaft. The common crank and link connection between the pistons and shaft of the meter will not effect this result. To secure the result, it is necessary to use a cam with a specially designed contour, such cam being engaged with and rotated by cam followers which are movable by and with the pistons. With meters of this cam-drive type, calibration has been effected heretofore by adjustable stops, with which the pistons abut and by which their strokes are limited,—lost motion between the cam and followers being provided to enable one of the pistons to be momentarily arrested by the stop while the cam continues to be turned by another piston. Such an arrangement is undesirable because it results in noisy operation due to the impingements between the pistons and their adjustable stops and between the cam followers and their cam. It also results in pulsations in flow.

This invention has for its object the provision of a displacement meter, having the described cam drive and a calibrating means so constructed and arranged that noise-creating impingements, due to lost motion between the piston-driven cam followers and the cam or due to other means, can be entirely avoided thereby securing quiet operation and at the same time retaining the desirable advantage of a discharge flow substantially free from pulsations.

The invention also has for an object the provision of an improved calibrating means, consisting of a mounting of the cam for limited radial movement with respect to the meter shaft with which it turns and a means, preferably accessible for operation from outside the meter, for manually shifting the cam radially with respect to its shaft to vary the stroke of the pistons of the meter.

Other objects will appear as the detailed description proceeds and will be pointed out in the appended claim.

The invention will be disclosed for illustrative purposes in connection with the accompanying drawings in which:—

Fig. 1 is an exterior elevational view of a piston meter embodying the invention;

Fig. 2 is a sectional plan view taken on the line 2—2 of Fig. 3;

Fig. 3 is a sectional elevational view taken on the line 3—3 of Fig. 1;

Fig. 4 is a fragmentary sectional plan view taken on the line 4—4 of Fig. 3;

Fig. 5 is a fragmentary sectional elevational view taken on the line 5—5 of Fig. 4;

Fig. 6 is a fragmentary bottom plan view showing the sealable means for holding the cam adjusting device in various positions of adjustment;

Fig. 7 is an enlarged top plan view of the cam and its adjusting means; and

Figs. 8 and 9 are sectional views taken on the lines 8—8 and 9—9, respectively, of Fig. 7.

Referring to these drawings, the meter includes two main casing members 11 and 12 which are suitably held together as by cap screws 13 (Fig. 1). The lower member 11 is formed with a plurality of cylinders 14 (Fig. 2), radiating from a central chamber 15, with which the inner ends of all the cylinders communicate. These cylinders are arranged in pairs,—there being two such pairs as shown,—and the cylinders of each pair are oppositely disposed in axial alignment. The common axis of one pair of cylinders lies in the same plane but at right angles to the common axis of the other pair of cylinders. A suitable piston 18 is slidably mounted in each cylinder and the pistons in opposed cylinders are interconnected by frames 19, each frame being rigidly secured to two opposed pistons by cap screws 20 and also longitudinally slotted, as at 21, to clear the hollow drive shaft 22 which carries the operating cam 23. As shown in Fig. 3, one frame 19 is offset to lie above the cam and the other to lie below the cam. Cam followers, in the shape of rolls 24 are rotatably mounted, one on each piston, and engage the periphery of cam 23.

The cam is preferably constructed, as more particularly disclosed in U. S. Letters Patent, No. 2,091,912, granted August 31, 1937, so that throughout the cycle of operation of the meter equal increments of volume of liquid discharged will produce equal increments of rotation of the shaft 22. The cam is of the positive motion type, being engaged at diametrically opposite points by two rolls 24.

The shaft 22 is mounted centrally in chamber 15 with its axis passing vertically through the point of intersection of the axes of the two pairs of cylinders. This shaft at its ends is mounted in ball bearings 25 (Fig. 3) one in the upper wall of chamber 15 and the other in a removable head 26 forming part of the lower wall and secured to casing 1 by cap screws 27. The shaft is flanged, as at 28, for engagement with the inner race of each bearing and is thereby held against endwise movement. This shaft has a cylindrical bore extending from end to end and located coaxially thereof. Fixed to shaft 22 (as herein shown formed integrally therewith) is a flange-like part 29 (best shown in Figs. 7 to 9) which forms a carrier for cam 23. The flat lower face of the cam rests on the flat upper face of the carrier 29 and these two faces are held in sliding engagement by a pair of studs 30, threaded into the carrier and passing through slots 31 which are provided in the cam and extend in a direction parallel to that radius of the cam lying centrally between the studs. These studs firmly hold the cam at all times to its carrier against displacement in any other than the one radial direction shown. The cam 23 encompasses shaft 22 but, as will be clear from Fig. 7, there is sufficient clearance between these parts to enable the necessary range of radial movement of the cam.

The mechanism for radially moving the cam includes a circular rack 32 mounted within the hollow shaft 22 with freedom for movement axially thereof. The shaft has a radial slot therethrough affording clearance for a segment gear 33 which is mounted on the cam carrier 29. The carrier is slotted at 34 to receive the gear and on opposite sides of this slot has upstanding bearings 35, providing U-shaped recesses or seats in which are received the trunnions 36, projecting one from each face of the gear and fixed thereto. The cam has a radial slot 37 wide enough to receive the upstanding bearings 35 and long enough to permit the necessary range of radial movement of the cam. The cam also has two smaller slots 38, which intersect the slot 37 at right angles and receive one in each eccentric 39, fixed one on the outer end of each trunnion 36. A flat spring 40, fixed at one end by the studs 30 to cam 23, has its other end forked to straddle gear 33 and provide two arms which overlie the bearings 35 and hold the trunnions 36 in their seats. It will be clear that an axial movement of rack 32 will turn gear 33 and cause the eccentrics 39 to shift the cam radially.

The circular rack is fixed to a rod 41 which extends downwardly beyond the lower end of shaft 22 and through and beyond the lower head 26. This head, at a point just below the lower end of shaft 22, is interiorly screw threaded, forming a nut, and rod 41 is threaded, as at 42, to engage this nut. Thus, by turning rod 41, the rack 32 may be raised or lowered. It is to be noted that the turning of rod 41 and rack 32 is merely incidental to the use of the screw and nut means used for moving the rack axially and the rack could equally well be moved axially without turning, if desired. However, the described arrangement is preferred because by using a fine screw thread, the rod may easily be moved axially by increments as small as may be desired to secure accurate calibration. In normal operation, the rod 41 and rack 32 remain stationary and, since the rack 32 is circular, the gear 33 can and does revolve freely around it. It will also be clear that the rack can be moved to shift the cam even while the meter is in operation.

The lower end of rod 41 extends through a suitable stuffing box 43 provided in head 26 as shown in Fig. 3, and below this head and fixed to the outer end of rod 41 is an annular hand wheel 44, which encompasses the stuffing box portion of head 26. This wheel 44 has a circular series of angularly spaced longitudinal slots 45, which extend from its upper end in a direction parallel with the axis of the wheel downwardly a substantial distance. Inside the wheel is a perforated lug 46, formed on head 26. To hold rack 32 in its various positions of adjustment, a pin 47 is passed through one of the slots 45 and into the perforation of lug 46. The outer end of this pin and the outer end of rod 41 are provided with holes to receive a sealing wire 48 which is threaded through these holes and has its ends fastened with a seal 49. Thus, the pin cannot be removed without breaking the seal and until the pin is removed the rack 32 cannot be moved to change the adjustment of cam 23.

In order to prevent segment gear 33 from being turned far enough so that its teeth may become disengaged from rack 32, it is provided with upper and lower projections 33' which will by abutment with the carrier 29, limit the turning movement of the gear sufficiently for the purpose. As shown, the gear may turn substantially ninety degrees clockwise or ninety degrees counter-clockwise from the position herein shown. If turned to this extent in a counter-clockwise direction, the upper projection 33' will engage the top of a lug 29' on the cam carrier and, if turned clockwise, the lower projection 33' will abut the left hand end wall of slot 34.

The casing member 11 is provided on its upper face with an annular valve seat 50, located coaxially with respect to shaft 22 and provided with four ports 51 one for each cylinder 14 and arranged in a circular series. A longitudinal passage 52 connects the lower end of each port to the clearance space 53 formed in the head 16 of each cylinder. Resting on seat 50 is a valve 54, which is driven by a shaft 55 from the cam shaft 22. The upper end of shaft 55 is keyed to the valve and its lower end telescopes into the upper end of the hollow shaft 22 and has a slot 56 therein to receive a pin 57 which is fixed in shaft 22 and passes diametrically therethrough. Thus, shaft 55 is driven from shaft 22 through the pin-and-slot connection and the arrangement permits the shaft 55 and attached valve to be freely removed by lifting it out of place after casing 12 is removed.

Liquid under pressure is admitted to an outer annular chamber 58 (Fig. 3) in the casing 12 through an inlet passage 59 (Figs. 1 and 3). A wall 60, depending from the upper wall of casing 12, partitions off the interior of the casing and forms an outlet chamber 61 from which an outlet passage 62 leads outwardly to an outer face of the casing. In the lower wall of chamber 61 is a circular, screw-threaded opening into which is threaded an annular flanged ring 63. The valve 54 has on its upper face an annular seat 64 on which rests an annular seal ring 65. The rings 63 and 65 are interconnected by an expansible and contractible bellows 66, fixed to each ring. A spring 67 acts between the rings 63 and 65 and presses the latter against the valve and the valve against its seat.

The valve 54 has a chamber 68 therein open at its upper end and communicating at all times through bellows 66 with the outlet chamber 61 and outlet passage 62. In the floor of this valve chamber 68 is a single port opening 69. At a diametrically opposite point the valve 54 has a recess 70 in its outer wall enabling liquid from chamber 58 to pass therethrough into an underlying port 51. The valve 54 rotates counterclockwise as viewed in Fig. 4 and it so controls the ports 51 that liquid is successively admitted to the several cylinders shown in Fig. 2, taken in counterclockwise order with respect to their position about the axis of shaft 22. Also, liquid is successively exhausted from the cylinders in the same order and exhausted from each cylinder at the time when its opposing and connected cylinder is receiving liquid.

Any suitable provisions may be made for driving a register or indicator of any desired type from the shaft 22. As shown herein, the valve 54 has a diametrically disposed, upstanding web 73 (Fig. 4) which engages and drives the two depending arms 74 of a fork 75 which is fixed to the lower end of a small shaft 76 located above and coaxially of shaft 55 with its lower end projecting into the discharge passage. This shaft 76 has a lower bearing in casing 12 and an upper bearing in a plate 77 fixed to this casing by cap screws 78. Between these bearings the casing is chambered to receive a pair of seal rings 79, which are slidably mounted on shaft 76 and forced by a spring 80, one against the lower and one against the upper bearing of the shaft 76. This shaft extends outside casing 12 for connection in any suitable way to the indicating means.

The assembly of the parts within the chamber 15 and the cylinders 14 which communicate therewith may not be entirely clear without some explanation. The cam 23 and the parts which interconnect it with the flange 29 on shaft 22 and which enable the cam to be shifted on the flange, are assembled outside the meter and later put in place as one unit. It is to be noted that the slot 37 in cam 23 is large enough to allow the flanges 28 on shaft 22 to pass therethrough. The shaft 22 is then pushed to the right hand end of the slot 37 and then the remaining parts are assembled in a manner which will be obvious. The gear 33 is moved to its lower position. This unit is put in place in chamber 15 prior to the application of the heads 16 and 26 thereto and prior to the application of shaft 55. The upper bearing 25 is put in place through the open end of any one cylinder 14. The shaft and cam unit is then slid in through the open outer end of a cylinder 14, the unit being tilted so that its shaft lies about 45° to the vertical, and on continued movement, the lower end of shaft 22 drops into the central hole in the lower wall of chamber 15. The shaft is then raised and its upper end engaged in the upper bearing. Then while the shaft is held thus positioned, the head 26 with the lower bearing is put in place and the lower end of shaft 22 is engaged in the lower bearing. The rack 32 is then applied and turned until the gear 33 is raised to the position shown. Then the pistons are slid into place. The right hand piston 18 (Fig. 2) with the frame 19 attached thereto is slid in place through the outer end of right hand cylinder 14, the slot 21 in frame 19 having its right hand end open and with outwardly diverging walls to allow easy entry of the shaft 22. The left hand piston is then fastened to frame 19. Similarly, the upper piston and attached frame 19 is slid in place through the open outer end of the upper cylinder, after which the lower piston is fastened to this second frame 19. The heads 16 are then applied, the valve and its shaft 55 are dropped in place and the remaining parts assembled in a manner which will be obvious.

The operation of the meter will next be described. As shown, the piston in the upper cylinder is being driven downwardly to turn cam 23 in a counterclockwise direction and is about midway in its stroke. Movement of the upper piston moves the piston in the opposite and lower cylinder to expel liquid therefrom. At this exact moment, only one piston,—the uppermost—is driving the cam. The left hand piston is at its point of reversal, having just finished its exhaust stroke and being about to commence its intake stroke. The right hand piston also is at its point of reversal, having just finished its intake stroke and being about to commence its exhaust stroke. The left hand piston will shortly commence to drive cam 23, and for a time the cam will be driven by the combined efforts of the upper and the left hand piston. At the time when the upper piston ceases driving, the left hand piston will be about midway in its driving stroke and the lower piston will then commence to drive the cam. When the left hand piston ceases to drive the cam, the right hand piston will take up the work and so on, the cam being driven except momentarily at the four points in each cycle (at the points of reversal of the four pistons) by the joint action of two pistons. There are no dwell portions in the periphery of cam 23 and from the low point A to the high point B, the contour of the driving face C is a continuous rise. This contour is so designed that for equal angular increments of rotation of cam 23, the sum of the volumes of liquid displaced from the cylinders which are discharging, is a constant. Uniform flow is obtained and the movement of shaft 22 is at all times proportional to the volume discharged so that accuracy in the indications of the register (driven by shaft 22) is secured, regardless of the point in the cycle at which the pistons stop.

It is to be noted that the face C only of the cam functions in the driving action and, except for the possibility that one may wish to reverse the direction of rotation of cam 23, its lower face C' might be omitted. It will likewise be appreciated that some clearance provision is necessary to enable adjustment of cam 23. That is, if one wished to adjust cam 23 by moving it radially to the right from the position shown in Fig. 2, there must be some lost motion between the upper and lower rolls and the cam. Actually, the cam does not need to move more than about one one-hundredth of an inch radially in each direction from the midposition illustrated to secure an ample range of calibration, especially since the displacement of all four cylinders is varied. Still some clearance is necessary for the purpose and it has been provided by making the face C' slightly smaller than the face C. The two faces are made substantially alike in contour but corresponding radii of the two surfaces differ by say 10 one-thousandths of an inch. For example, suppose that the dotted line D in Fig. 7 represents a replica of face C, the face C' lies just inside it and is spaced therefrom by the amount noted. Thus, the lower roll 24 is out of contact with the surface C' and there is enough lost motion between those two elements to enable the necessary range of radial movement of the cam. The provision of this lost motion is not inconsistent with the expressed purpose of avoiding noisy impingements of the followers on the cam. Such impingements could occur only at the times when the pistons are reversing and, at such times in the arrangement illustrated, there is no lost motion between the followers and the cam. For example, in Fig. 7, the left hand and right hand followers are at their positions of reversal and the cam closely fits between these rolls with only such clearance as is usual and necessary for easy running. Thus, as the left hand roll is forced to the right, there is substantially no lost motion to take up and no chance for a noise-creating blow. Similarly, after the cam has turned 90°, all the lost motion between the upper and lower rolls will be taken up at the time when necessary to avoid a noisy impingement of the lower roll on the cam as it reverses and moves upward under pressure.

From the foregoing description, it will be clear that the invention provides a displacement meter in which the pistons drive the indicator shaft through a cam in such a way that equal increments of volume of liquid discharged from the meter will produce equal increments of angular movement of the indicator shaft and in which the meter may be calibrated in such a way as to entirely avoid noisy impingements due to lost motion between the cam and the followers carried by the piston.

What I claim is:

In a meter, a shaft, a plurality of cylinders disposed radially of and about said shaft and arranged in opposing pairs, pistons one for each cylinder, each piston being rigidly interconnected with the piston in the opposing cylinder, pairs of cam followers one pair for and movable with each pair of connected pistons, a cam on said shaft between said pairs of followers and acted upon successively by said followers and rotated thereby to drive said shaft, the dimension of said cam taken on a line between its high and low points being substantially equal to the shortest distance between the followers of each pair, whereby when each pair of connected pistons reaches the end of the stroke no lost motion exists between its followers and the cam at the time when one such follower ceases to drive the cam and the other such follower commences to drive the cam, said cam having a driving surface interconnecting said points on one side of said line for successive pressure engagement by the followers and a second surface interconnecting said points on the opposite side of said line for successively providing lost motion between each follower and the cam during an intermediate portion of the discharge stroke of its piston, and means for moving said cam on said shaft for calibration purposes to vary the volume displaced by each said piston.

WARREN H. DE LANCEY.